United States Patent
Shiner et al.

(10) Patent No.: US 11,070,286 B1
(45) Date of Patent: Jul. 20, 2021

(54) OPPORTUNISTIC NETWORK DEFRAGMENTATION AND OPTIMIZATION

(71) Applicant: Ciena Corporation, Hanover, MD (US)

(72) Inventors: Andrew D. Shiner, Ottawa (CA); John K. Oltman, Atlanta, GA (US); David W. Boertjes, Nepean (CA)

(73) Assignee: Ciena Corporation, Hanover, MD (US)

(*) Notice: Subject to any disclaimer, the term of this patent is extended or adjusted under 35 U.S.C. 154(b) by 0 days.

(21) Appl. No.: 16/868,991

(22) Filed: May 7, 2020

(51) Int. Cl.
| | | |
|---|---|---|
| *H04B 10/03* | (2013.01) | |
| *H04L 12/24* | (2006.01) | |
| *H04B 10/27* | (2013.01) | |
| *H04J 14/08* | (2006.01) | |

(52) U.S. Cl.
CPC ............ *H04B 10/03* (2013.01); *H04B 10/27* (2013.01); *H04J 14/08* (2013.01); *H04L 41/0816* (2013.01)

(58) Field of Classification Search
CPC ......... H04B 10/03; H04B 10/27; H04J 14/08; H04L 41/0816
USPC .............................................................. 398/8
See application file for complete search history.

(56) References Cited

U.S. PATENT DOCUMENTS

| | | | |
|---|---|---|---|
| 7,783,194 B2 | 8/2010 | Hyndman et al. | |
| 8,364,036 B2 | 1/2013 | Boertjes et al. | |
| 8,553,586 B2 | 10/2013 | Smith et al. | |
| 8,571,415 B1* | 10/2013 | Rider ................. | H04J 14/0246 398/175 |
| 8,666,247 B2 | 3/2014 | Srinivasan et al. | |
| 9,071,532 B2 | 6/2015 | Oltman et al. | |
| 9,167,318 B1 | 10/2015 | Connolly et al. | |
| 9,831,947 B2 | 11/2017 | Boertjes | |
| 9,828,296 B2 | 12/2017 | Armolavicius et al. | |
| 10,097,263 B2 | 10/2018 | Shiner et al. | |
| 10,432,342 B1* | 10/2019 | Bathula ................ | H04J 14/021 |
| 10,491,501 B2 | 11/2019 | Armolavicius et al. | |
| 10,587,339 B1 | 3/2020 | Al Sayeed et al. | |
| 2003/0016414 A1* | 1/2003 | Solheim ............. | H04J 14/0283 398/82 |

(Continued)

OTHER PUBLICATIONS

Gagan Choudhury et al., J. Opt. Commun. Netw./vol. 10, No. 10, Two Use Cases of Machine Learning for SDN-Enabled IP/Optical Networks: Traffic Matrix Prediction and Optical Path Performance Prediction [Invited], Optical Society of America, Oct. 2018, pp. 52-62.

*Primary Examiner* — Dalzid E Singh
(74) *Attorney, Agent, or Firm* — Clements Bernard Walker; Lawrence A. Baratta, Jr.; Christopher L. Bernard

(57) ABSTRACT

Systems and methods include determining a defragmentation plan that changes a configuration of a network to move the network from a current state of operation to a new state of operation; updating any of the defragmentation plan and the new state of operation in response to an opportunity presented during operation of the network; and implementing one or more steps in the defragmentation plan based on the opportunity. The opportunity can be anticipated to occur at a future time and implementation of the one or more steps is conditioned on occurrence of the opportunity. For example, the opportunity can include any of a maintenance window, a network equipment change, a capacity change in the network, a change to demand in the network, an external event including weather, and changes in links in the network. Also, the opportunity can include a fault.

16 Claims, 4 Drawing Sheets

(56) References Cited

U.S. PATENT DOCUMENTS

| | | | |
|---|---|---|---|
| 2007/0172237 A1* | 7/2007 | Risbood | H04J 14/0241 |
| | | | 398/59 |
| 2008/0159742 A1* | 7/2008 | Krishnaswamy | H04J 14/0227 |
| | | | 398/79 |
| 2013/0089323 A1* | 4/2013 | Patel | H04B 10/0793 |
| | | | 398/27 |
| 2013/0236169 A1 | 9/2013 | Gaudette et al. | |
| 2015/0333862 A1 | 11/2015 | Swinkles et al. | |
| 2016/0050470 A1 | 2/2016 | Swinkles et al. | |
| 2016/0087849 A1* | 3/2016 | Balasubramanian | H04L 41/12 |
| | | | 709/221 |
| 2016/0301579 A1 | 10/2016 | Djukic et al. | |
| 2018/0026716 A1* | 1/2018 | Takita | H04J 14/0201 |
| | | | 398/82 |
| 2018/0359029 A1 | 12/2018 | Shiner et al. | |
| 2019/0037288 A1* | 1/2019 | Fujisawa | H04B 10/0793 |
| 2019/0326992 A1 | 10/2019 | Charlton et al. | |
| 2020/0007236 A1* | 1/2020 | Choudhury | H04L 41/0813 |
| 2020/0007965 A1 | 1/2020 | Swinkles et al. | |
| 2020/0036468 A1 | 1/2020 | Roberts et al. | |

* cited by examiner

OPPORTUNISTIC NETWORK DEFRAGMENTATION AND OPTIMIZATION

FIELD OF THE DISCLOSURE

The present disclosure generally relates to networking. More particularly, the present disclosure relates to systems and methods for opportunistic network defragmentation and optimization, such as in optical networks, Time Division Multiplexed (TDM) networks, packet networks, and combinations thereof, i.e., multi-layer networks.

BACKGROUND OF THE DISCLOSURE

Networks are realized with physical equipment, i.e., network elements, nodes, etc., that operate with configured settings. Settings can be anything—provisioned services, routing of services, path computation for new services, optical power, optical spectrum assignments, etc. Further settings can be based on user-provisioning, an automatic configuration such as via a control plane, Software Defined Networking (SDN) controller or application, planning tool, etc. The automatic configuration can be based on various protocols, if . . . then rules, path computation algorithms, Routing and Spectrum Assignment (RSA) algorithms, Routing and Wavelength Assignment (RWA) algorithms, machine learning, etc. A network can be viewed as operating in a certain state, based on existing settings and configurations. As described herein, the terms settings and configuration may be used interchangeably, and each denotes some characteristics of the network, the network elements, operation of the network and the network elements, etc. Any change in the existing settings and configurations moves the network to a new state.

Each possible state of a network has an associated value which may be calculated using a combination of cost and value functions that consider the present state of the network, future potential benefit and may combine as inputs a variety of signals such as economic considerations, physical constraints, physics estimates, present and future technology capabilities, current and anticipated demand, weather, and other factors. Here costs work to decrease the value of the network and any combination of positive and negative network costs or values are allowed. When considering a sequence of defragmentation steps, it is necessary to consider the value of the network in the defragmented final state discounted by the transition costs going from the initial state to the final state through zero or more intermediate states. This discounted value must be greater than the value of the present state to justify defragmentation. Of course, the goal in any network configuration change is to move the network to a more optimal state.

There are various techniques known in the art for improving, i.e., defragmenting, a network. For example, commonly-assigned U.S. Pat. No. 10,298,356, Chatelain et al., "Optimal partial reconfiguration of Spectrum in Optical Networks," the contents of which are incorporated herein by reference, describes techniques for finding a sequence of steps to defragment a network in order to minimize wavelength use. Chatelain et al. describes several techniques, such as Integer Linear Programming, Tabu searches, and genetic algorithms. In N. C. Luong et al., "Applications of Deep Reinforcement Learning in Communications and Networking: A Survey," arXiv:1810.07862v1, Oct. 18, 2018, the contents of which are incorporated herein by reference, the authors describe several applications of reinforcement learning in network optimization. Examples include path routing for wireless networks, traffic engineering, and routing. These are two examples of existing network defragmentation, and various other similar publications are known.

Disadvantageously, the existing defragmentation techniques do not consider the cost associated with any configuration change. Specifically, it is critical for networks to deliver to end-users, a certain level of service. Operationally, any configuration change has a cost to the network that is not captured in the existing defragmentation techniques. For example, it may be advantageous to move a service on a current wavelength or portion of the spectrum, or on a current path, etc. However, any move to the service may cause an outage or disruption to the end-user. Also, existing defragmentation techniques are performed episodically and are not able to take advantage of changes in network and transition costs that result from real-time events that occur in networks. Thus, existing defragmentation requires a series of service impacting transitions that are costly and disruptive to the network. These high costs cases cause operators to choose not to implement the steps determined by classical defragmentation techniques.

BRIEF SUMMARY OF THE DISCLOSURE

The present disclosure relates to systems and methods for opportunistic network defragmentation and optimization, such as in optical networks, Time Division Multiplexed (TDM) networks, packet networks, and combinations thereof, i.e., multi-layer networks. The present disclosure overcomes the limitations of the existing defragmentation techniques by running defragmentation in real-time (or near real-time, to provide a current defragmentation view) at a network orchestration level such that it can be responsive to events in the network. Having a current defragmentation view creates opportunities for low-cost partial defragmentation. As described herein, low-cost partial defragmentation includes performing a configuration change in conjunction (concurrent) with some other network event (e.g., fault, maintenance window, capacity change, etc.). A simple example includes when a service has been switched off its home path (i.e., working path) and a current defragmentation view indicates the service would be more optimal on a different home path, at a different wavelength or spectrum, etc., the service can be switched to the different home path, to the different wavelength or spectrum, etc. when it reverts. That is, the current defragmentation view allows a configuration change in concert with a separate network event. The view is the cost of the defragmentation is low or zero due to the separate network event. In another example, the current defragmentation view can look for opportunities to reduce fragmentation during an otherwise planned maintenance window as well as having the defragmentation suggest other hardware and services that might be worth adding to the maintenance window.

In an embodiment, a method and a non-transitory computer-readable storage medium having computer readable code stored thereon for programming a processor are described. The steps associated with the method and the computer readable code include determining a defragmentation plan that changes a configuration of a network to move the network from a current state of operation to a new state of operation; updating any of the defragmentation plan and the new state of operation in response to an opportunity presented during operation of the network; and implementing one or more steps in the defragmentation plan based on the opportunity. In another embodiment, an apparatus includes a network interface and a processor communicatively coupled to one another; and memory comprising instructions that, when executed, cause the processor to determine a defragmentation plan that changes a configuration of a network to move the network from a current state of operation to a new state of operation, update any of the defragmentation plan and the new state of operation in response to an opportunity presented during operation of the network, and implement one or more steps in the defragmentation plan based on the opportunity.

The opportunity can be anticipated to occur at a future time and implementation of the one or more steps is conditioned on occurrence of the opportunity. The opportunity can include any of a maintenance window, a network equipment change, a capacity change in the network, a change to demand in the network, an external event including weather, and changes in links in the network. The opportunity can include a maintenance window, and the steps can further include providing a recommendation of any of additional hardware and services that may be included or added as part of the maintenance window to further the implementing of the defragmentation plan or to improve the new state. The opportunity can include a maintenance window, and the steps can further include providing a recommendation of additional hardware that may added as part of the maintenance window to further the implementing of the defragmentation plan or to improve the new state.

The opportunity can include a fault. The one or more steps can include changing any of a path of a photonic service and a wavelength or spectrum of the photonic service, in response to the fault. The defragmentation plan can include a sequence of steps between the current state of operation to the new state of operation, each including a transition cost. The one or more steps can be selected to optimize one or more of a value of the new state and the transition cost in consideration of the opportunity. The opportunity was not contrived for the purpose of aiding defragmentation. The operation of the network can include monitoring of the network to identify a plurality of opportunities. The defragmentation plan can be determined based on an initial opportunity.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
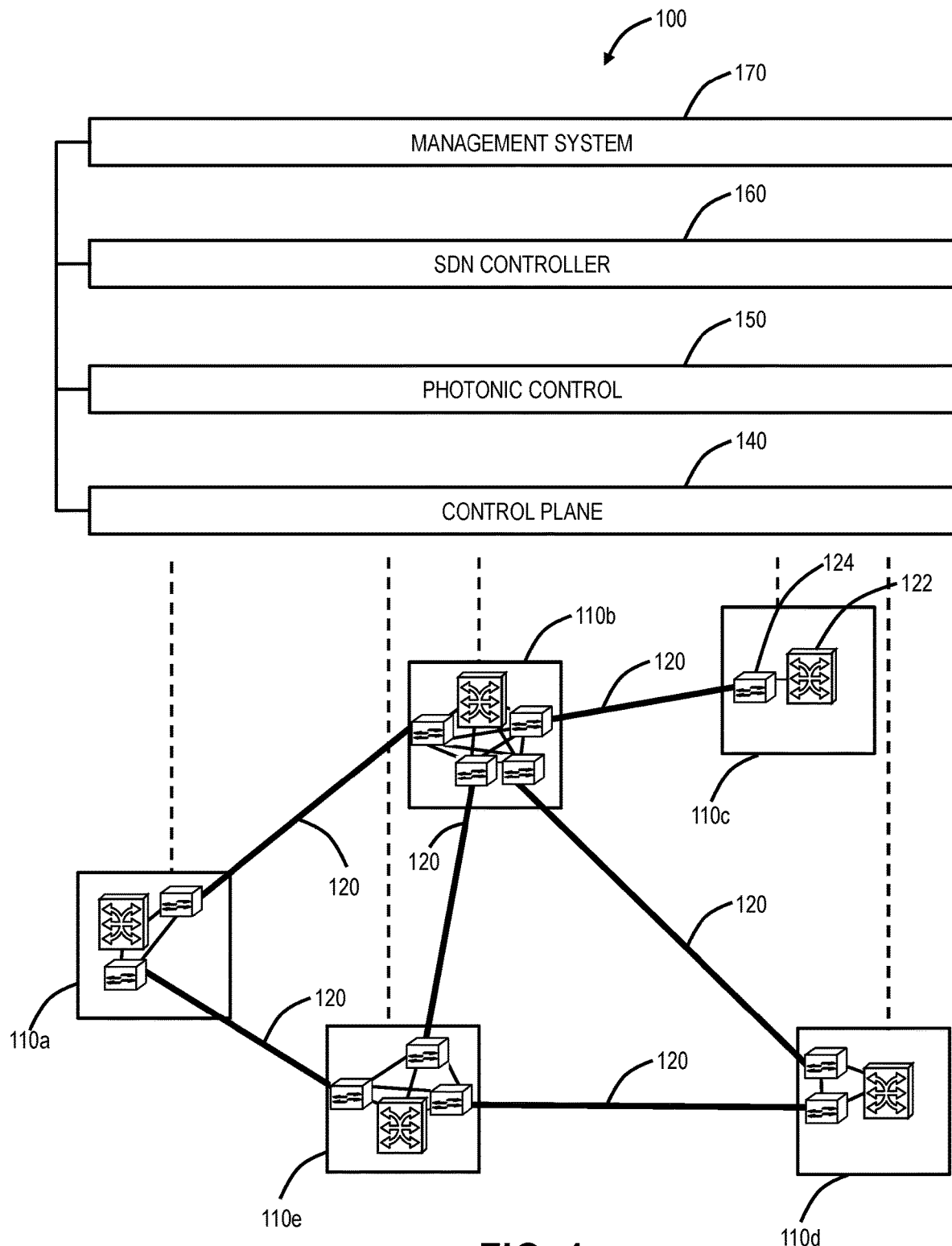
FIG. 1 is a network diagram of a network with five interconnected sites.

Again, the present disclosure relates to systems and methods for opportunistic network defragmentation and optimization, such as in optical networks, Time Division Multiplexed (TDM) networks, packet networks, and combinations thereof, i.e., multi-layer networks. The present disclosure overcomes the limitations of the existing defragmentation techniques by running defragmentation in real-time (or near real-time, to provide a current defragmentation view) at a network orchestration level such that it can be responsive to events in the network. Having a current defragmentation view creates opportunities for low-cost partial defragmentation. As described herein, low-cost partial defragmentation includes performing a configuration change in conjunction (concurrent) with some other network event (e.g., fault, maintenance window, capacity change, etc.). A simple example includes when a service has been switched off its home path (i.e., working path) and a current defragmentation view indicates the service would be more optimal on a different home path, at a different wavelength or spectrum, etc., the service can be switched to the different home path, to the different wavelength or spectrum, etc. when it reverts. That is, the current defragmentation view allows a configuration change in concert with a separate network event. The view is the cost of the defragmentation is low or zero due to the separate network event, i.e., any service impact due to the configuration changes is mitigated. In another example, the current defragmentation view can look for opportunities to reduce fragmentation during an otherwise planned maintenance window as well as has having the defragmentation suggest other hardware and services that might be worth adding to the maintenance window. Of note, the present disclosure uses both the terms "cost" and "value," and those of ordinary skill in the art recognize these are meant to refer to some metric that can be used for comparing two network states, or generally anything in the network.

Thus, having a current defragmentation view enables low-cost partial defragmentation over time, rather than episodically with service-impacting costs. That is, configuration changes can be spread out, implemented with an associated network event, etc., thereby minimizing service impact. Thus, opportunistic defragmentation recognizes opportunities for partial network defragmentation at little or no cost. It is expected that network operators will be much more receptive to defragmenting their networks if the steps can be performed as part of other network operations. In today's workflow, the defragmentation steps would be recommended by an algorithm that is run episodically (either periodically, on-demand, etc.). It would suggest a large set of changes to fully defragment a network. The opportunistic defragmentation approach continuously monitors the network and suggests opportunities to make changes in response to events. This continuous optimization can be included as part of a management system, an orchestration system, an SDN controller or application, etc.

Network

FIG. 1 is a network diagram of a network 100 with five interconnected sites 110a, 110b, 110c, 110d, 110e. The sites 110 are interconnected by a plurality of links 120, i.e., fiber spans. Those skilled in the art recognize a physical link 120 can include one or two optical fibers for bidirectional communication. Each of the sites 110 can include a switch 122 and one or more WDM network elements 124. The switch 122 is configured to provide services at Layers 1 (e.g., Optical Transport Network (OTN)) and/or Layer 2 (e.g., Ethernet, Multiprotocol Label Switching (MPLS)) and/or Layer 3 (e.g., Internet Protocol (IP)) where the switch would normally be called a router. For simplicity of disclosure herein, it will be referred to as a switch in all cases. The WDM network elements 124 provide the photonic layer (e.g., Layer 0) and various functionality associated therewith (e.g., multiplexing, amplification, optical routing, wavelength conversion/regeneration, local add/drop, etc.) including photonic control. Of note, while shown separately, those of skill in the art will recognize that the switch 122 and the WDM network elements 124 may be realized in the same network element. For example, a switch 122 can include pluggable transceivers that provide DWDM. The photonic layer and the photonic control operating thereon can also include intermediate amplifiers and/or regenerators on the links 120, which are omitted for illustration purposes. The network 100 is illustrated, for example, as an interconnected mesh network, and those of skill in the art will recognize the network 100 can include other architectures, with additional sites 110 or with fewer sites, with additional network elements and hardware, etc.

The sites 110 communicate with one another optically over the links 120. The sites 110 can be network elements which include a plurality of ingress and egress ports forming the links 120. Further, the nodes 110 can include various degrees, i.e., the site 110c is a one-degree node, the sites 110a, 110d are two-degree nodes, the site 110e is a three-degree node, and the site 110b is a four-degree node. The number of degrees is indicative of the number of adjacent nodes at each particular node. The network 100 includes a control plane 140 operating on and/or between the switches 122 at the sites 110a, 110b, 110c, 110d, 110e. The control plane 140 includes software, processes, algorithms, etc. that control configurable features of the network 100, such as automating discovery of the switches 122, capacity of the links 120, port availability on the switches 122, connectivity between ports; dissemination of topology and bandwidth information between the switches 122; calculation and creation of paths for connections; network-level protection and restoration; and the like. In an embodiment, the control plane 140 can utilize Automatically Switched Optical Network (ASON), Generalized Multiprotocol Label Switching (GMPLS), Optical Signal and Routing Protocol (OSRP) (from Ciena Corporation), or the like. Those of ordinary skill in the art will recognize the optical network 100, and the control plane 140 can utilize any type of control plane for controlling the switches 122 and establishing connections.

The optical network 100 can include photonic control 150, which can be viewed as a control algorithm/loop for managing wavelengths/optical spectrum from a physical perspective at Layer 0. In one aspect, the photonic control 150 is configured to add/remove wavelengths/spectrum from the links in a controlled manner to minimize impacts to existing, in-service wavelengths. For example, the photonic control 150 can adjust modem launch powers, optical amplifier gain, Variable Optical Attenuator (VOA) settings, Wavelength Selective Switch (WSS) parameters, etc. The photonic control 150 can also be adapted to perform network optimization on the links 120. This optimization can also include re-optimization where appropriate. In an embodiment, the photonic control 150 can adjust the modulation format, baud rate, frequency, wavelength, spectral width, etc. of optical modems in addition to the aforementioned components at the photonic layer. In an embodiment, the photonic control 150 can include support for capacity mining where the physical parameters are adjusted to provide increased capacity without requiring additional hardware. For both the control plane 140 and the photonic control 150, associated controllers can be either centralized, distributed, or embedded in the network elements. A key aspect of the optical network is the technology is fundamentally analog in nature, and optical performance is subject to various linear and non-linear impairments on the links 120.

The optical network 100 can also include a Software-Defined Networking (SDN) controller 160. SDN allows the management of network services through abstraction of lower-level functionality. This is done by decoupling the system that makes decisions about where traffic is sent (SDN control through the SDN controller 160) from the underlying systems that forward traffic to the selected destination (i.e., the physical equipment in the optical network 100). SDN calls for the ability to centrally program provisioning of forwarding on the optical network 100 in order for more flexible and precise control over network resources to support new services. The SDN controller 160 is a processing device that has a global view of the optical network 100. Additionally, the SDN controller 160 can include or connect to SDN applications which can utilize the data from the SDN controller 160 for various purposes.

There are various techniques for data communications between the switches 122, the WDM network elements 124, the control plane 140, the photonic control 150, and the SDN controller 160 for OAM&P purposes. These various techniques can include one or more of Optical Service Channels (OSCs), overhead communication channels, in-band communication channels, and out-of-band communication channels. OSCs are dedicated wavelengths between WDM network elements 124. The overhead communication channels can be based on SONET, SDH, or OTN overhead, namely the Data Communication Channel (DCC) or General Communication Channel (GCC). The in-band communications channels and the out-of-band communication channels can use various protocols. Collectively, these techniques for an OAM&P communications network over in the network 100. The OAM&P communications network may employ switching and/or routing protocols to provide resilient communications to all network elements 122, 124 in the event of a failure (e.g., fiber cut or equipment failure).

In an embodiment, the switches 122 and/or network elements 124 are configured to communicate with one another in the network 100 to operate the control plane for control plane signaling. This communication may be either in-band or out-of-band. For SONET networks and similarly for SDH networks, the switches 122 and/or network elements 124 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an embodiment, the switches 122 and/or network elements 124 can include an in-band signaling mechanism utilizing OTN overhead. The General Communication Channels (GCC) defined by ITU-T Recommendation G.709 are in-band side channels used to carry transmission management and signaling information within Optical Transport Network elements.

A management system 170 can be a processing device that supports OAM&P functions for the optical network 100. The management system 170 can be referred to as a Network Management System (NMS), an Element Management System (EMS), a Craft Interface (CI), etc. The management system can connect directly to the switches 122 and/or network elements 124, as well as connect through any of the control plane 140, the photonic control 150, the SDN controller 160, etc. The management system 170 is configured to provide a Graphical User Interfaces (GUI) for visualizing networking functions, as described herein.

The control plane 140, the photonic control 150, the SDN controller 160, the management system 170, or some other server or processing device, as well as a combination thereof, is configured to perform path computation and creation for connections; network-level protection and restoration; and the like.

As part of these functions, the processing device can include a topology database that maintains the current topology of the network 100, such as based on control plane signaling or the like, and a connection database that maintains available bandwidth on the links 120. In source-based routing, a source node for a connection is responsible for path computation and establishing by signaling other nodes in the network 100. For example, the originating node can signal a path through various techniques such as Resource Reservation Protocol-Traffic Engineering (RSVP-TE) (G.7713.2), Private Network-to-Network Interface (PNNI), Constraint-based Routing Label Distribution Protocol (CR-LDP), etc. and the path can be signaled as a Designated Transit List (DTL) in PNNI or an Explicit Route Object (ERO) in RSVP-TE/CR-LDP. As described herein, a photonic service refers to a signaled, end-to-end connection such as a Sub-network Connection (SNC), SNC Protection (SNCP), Label Switched Path (LSP), etc. Path computation generally includes determining a path, i.e., traversing the links 120 through the nodes from the source node to the destination node based on a plurality of constraints such as administrative weights on the links, bandwidth availability on the links, etc.

Service routing in the optical network 100 is well known. A path is considered valid for connection setup based on the availability of the switch 122, the links 120, and sufficient bandwidth available thereon. Photonic networks, i.e., Layer 0 and the wavelength interconnectivity of the WDM network elements 124, introduce additional complexity of successfully setting up a service. This can require that all Layer 0 services are pre-planned and/or managed manually. For example, potential paths for services at the photonic layer can be pre-planned by modeling them offline using a static snapshot of the network state to ensure that the computed paths are optically viable in terms of reach, nonlinear effects, dispersion, wavelength contention/blocking, etc. Here, the engineering ensures that each wavelength placed into service will work in a worst-case Optical Signal-to-Noise Ratio (OSNR), leading to the potential excess margin. Alternatively, the paths can be computed at runtime. Of course, a combination is possible.

Example Network Element/Node

Figure 2:
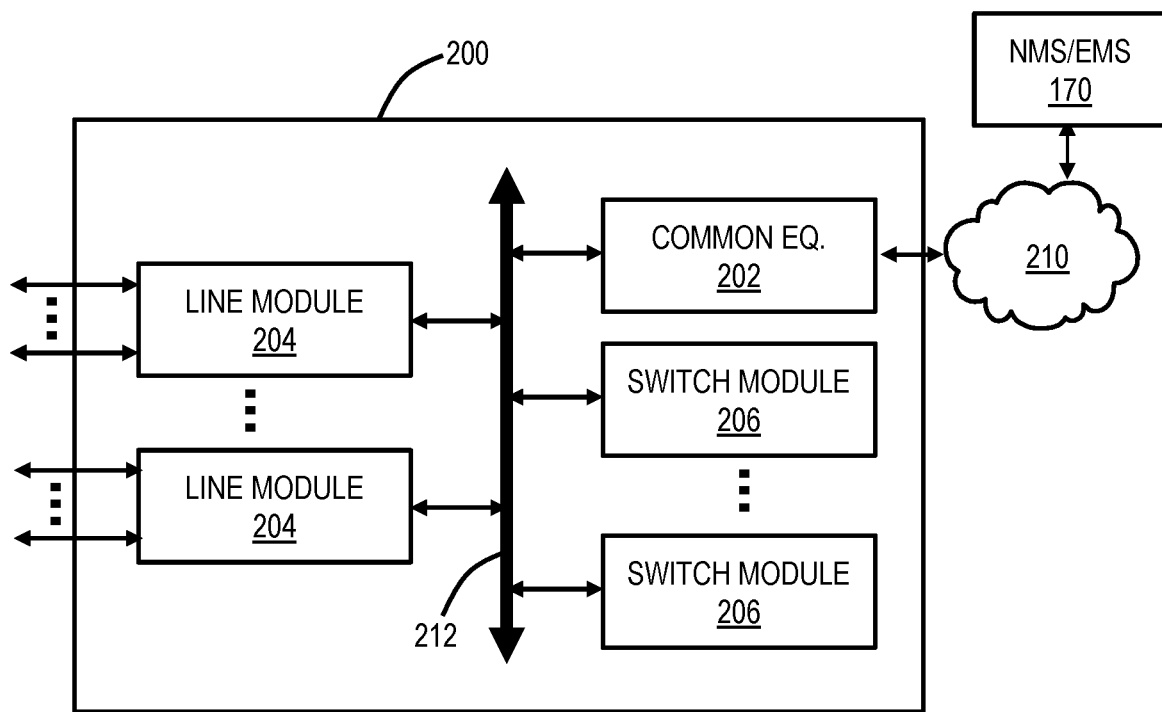
FIG. 2 is a network diagram of another optical network illustrating additional details of the control plane, the photonic control, and the SDN controller.

FIG. 2 is a block diagram of an example network element 200 for use with the systems and methods described herein. In an embodiment, the network element 200 can be a device that may consolidate the functionality of a Multi-Service Provisioning Platform (MSPP), Digital Cross-Connect (DCS), Ethernet and/or Optical Transport Network (OTN) switch, Wave Division Multiplexed (WDM)/DWDM platform, Packet Optical Transport System (POTS), etc. into a single, high-capacity intelligent switching system providing Layer 0, 1, 2, and/or 3 consolidation. In another embodiment, the network element 200 can be any of an OTN Add/Drop Multiplexer (ADM), a Multi-Service Provisioning Platform (MSPP), a Digital Cross-Connect (DCS), an optical cross-connect, a POTS, an optical switch, a router, a switch, a WDM/DWDM terminal, an access/aggregation device, etc. That is, the network element 200 can be any digital and/or optical system with ingress and egress digital and/or optical signals and switching of channels, timeslots, tributary units, wavelengths, etc. For example, switch 122 and/or the WDM network element 124 can be implemented as the network element 200.

In an embodiment, the network element 200 includes common equipment 202, one or more line modules 204, and one or more switch modules 206. The common equipment 202 can include power; a control module; Operations, Administration, Maintenance, and Provisioning (OAM&P) access; user interface ports; and the like. The common equipment 202 can connect to the management system 170 through a data communication network 210 (as well as the SDN controller 160, etc.). Additionally, the common equipment 202 can include a controller, a shelf processor, a control plane processor, etc. such as a controller 300 illustrated in FIG. 3. The network element 200 can include an interface 212 for communicatively coupling the common equipment 202, the line modules 204, and the switch modules 206 to one another. For example, the interface 212 can be a backplane, midplane, a bus, optical and/or electrical connectors, or the like. The line modules 204 are configured to provide ingress and egress to the switch modules 206 and to external connections on the links to/from the network element 200. In an embodiment, the line modules 204 can form ingress and egress switches with the switch modules 206 as center stage switches for a three-stage switch, e.g., a three-stage Clos switch. Other configurations and/or architectures are also contemplated.

Further, the line modules 204 can include a plurality of optical connections per module, and each module may include a flexible rate support for any type of connection. The line modules 204 can include WDM interfaces, short-reach interfaces, and the like, and can connect to other line modules 204 on remote network elements, end clients, edge routers, and the like, e.g., forming connections on the links in the network 100. From a logical perspective, the line modules 204 provide ingress and egress ports to the network element 200, and each line module 204 can include one or more physical ports. The switch modules 206 are configured to switch channels, timeslots, tributary units, packets, etc. between the line modules 204. For example, the switch modules 206 can provide wavelength granularity (Layer 0 switching); OTN granularity; Ethernet granularity; and the like. Specifically, the switch modules 206 can include Time Division Multiplexed (TDM) (i.e., circuit switching) and/or packet switching engines. The switch modules 206 can include redundancy as well, such as 1:1, 1:N, etc.

Those of ordinary skill in the art will recognize the network element 200 can include other components which are omitted for illustration purposes, and that the systems and methods described herein are contemplated for use with a plurality of different network elements with the network element 200 presented as an example type of network element. For example, in another embodiment, the network element 200 may not include the switch modules 206, but rather have the corresponding functionality in the line modules 204 (or some equivalent) in a distributed fashion. Also, the network element 200 may omit the switch modules 206 and that functionality, such as in the WDM network element 124. For the network element 200, other architectures providing ingress, egress, and switching are also contemplated for the systems and methods described herein. In general, the systems and methods described herein contemplate use with any network element, and the network element 200 is merely presented as an example for the systems and methods described herein.

Example Controller

Figure 3:
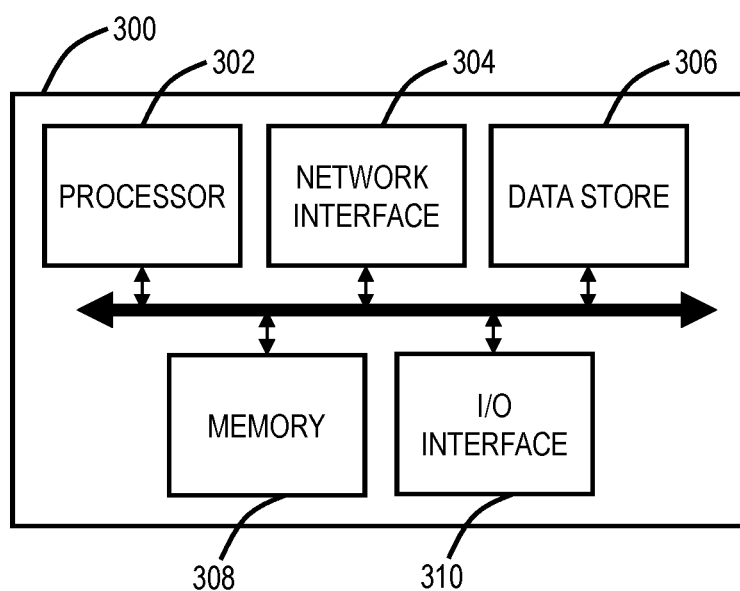
FIG. 3 is a block diagram of a controller that can form a controller for the network element of FIG. 2, as well as a processing device for realizing the SDN controller, the management system, or the like, in the network of FIG. 1.

FIG. 3 is a block diagram of a controller 300 which can form a controller for the network element 200, as well as a processing device for realizing the SDN controller 160, the management system 170, or the like. The controller 300 can be part of the common equipment, such as common equipment 202 in the network element 200, or a stand-alone device communicatively coupled to the network element 200 via the data communication network 210. The controller 300 can include a processor 302 which is a hardware device for executing software instructions such as operating the control plane 140. The processor 302 can be any custom made or commercially available processor, a central processing unit (CPU), an auxiliary processor among several processors associated with the controller 300, a semiconductor-based microprocessor (in the form of a microchip or chipset), or generally any device for executing software instructions. When the controller 300 is in operation, the processor 302 is configured to execute software stored within the memory, to communicate data to and from the memory, and to generally control operations of the controller 300 pursuant to the software instructions. The controller 300 can also include a network interface 304, a data store 306, memory 308, an I/O interface 310, and the like, all of which are communicatively coupled to one another and to the processor 302.

The network interface 304 can be used to enable the controller 300 to communicate on the DCN 210, such as to communicate control plane information to other controllers, to the management system 170, to the SDN controller 160, and the like. The network interface 304 can include, for example, an Ethernet module. The network interface 304 can include address, control, and/or data connections to enable appropriate communications on the network. The data store 306 can be used to store data, such as control plane information, provisioning data, OAM&P data, etc. The data store 306 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 306 can incorporate electronic, magnetic, optical, and/or other types of storage media. The memory 308 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 308 may incorporate electronic, magnetic, optical, and/or other types of storage media. Note that the memory 308 can have a distributed architecture, where various components are situated remotely from one another, but may be accessed by the processor 302. The I/O interface 310 includes components for the controller 300 to communicate with other devices. Further, the I/O interface 310 includes components for the controller 300 to communicate with the other nodes, such as using overhead associated with OTN signals, an Optical Service Channel (OSC), etc.

The controller 300 is configured to implement software, processes, algorithms, etc. that can control configurable features of the network 100, such as automating discovery of the network elements 200, capacity on the links 120, port availability on the network elements 200, connectivity between ports; dissemination of topology and bandwidth information between the network elements 200; path computation and creation for connections; network-level protection and restoration; and the like. As part of these functions, the controller 300 can include a topology database that maintains the current topology of the network 100, such as based on control plane signaling and a connection database that maintains available bandwidth on the links again based on the control plane signaling as well as management of the network risks for diverse path computation.

Network Fragmentation and Defragmentation

The network 100 grows over time as new equipment, routes, and services are added. At some point, poor routing decisions, deviations from the expected demand set as well as the impact of churn in the network 100 results in wavelength fragmentation, where it is difficult to place new services because of wavelength contention. Often it is possible to alleviate spectral contention by re-routing multiple existing services through a process referred to as defragmentation.

As described herein, fragmentation and defragmentation are related to a configuration of the network 100, the network elements 200, etc. Fragmentation means a current configuration is suboptimal as measured by some metric, reducing capacity and/or performance. Defragmentation determines a series of transitions that move the network 100 from its initial state or graph to some more optimal graph, usually by way of a series of intermediate graphs. Each configuration of the network 100 has an associated value, and the objective is to move toward a final state that optimizes (maximizes), the total network value while accounting for transition costs. Those of ordinary skill in the art recognize "optimizes" simply means moving from one state to another that has some advantage.

There are also costs associated with making changes to the network 100 when transitioning to intermediate graphs. This is especially true when changes are service impacting. The value of the final state discounted by the sum of the transition costs must be enough lower than that of the initial state to justify the defragmentation of the network 100. This is a problem with the existing approach—often, the transition costs are high enough that defragmentation is simply avoided. The high transition cost and elaborate sequence of maintenance windows associated with even partially defragmenting a major carrier's network has, in many cases, rendered defragmentation impractical.

As described herein, it is proposed to defragment parts of the network at little or no cost by adapting a defragmentation solution to take advantage of opportunities presented by network events such as fiber cuts, existing maintenance windows, etc. where those events were not directly initiated for the purpose of facilitating defragmentation.

For fiber cuts, the network 100 and the network elements 200 can include optical protection and restoration enabled hardware where each A-to-Z demand or Sub Network Connection (SNC) can be assigned a path or Designated Transit List (DTL). DTLs can be assigned to an SNC in DTL sets, which define a home path as well as a set of possible restoration paths that the service can move onto in the event of a failure. Restoration paths can also be automatically calculated, such as via the control plane 140, the SDN controller 160, etc. which typically employs a Dijkstra based algorithm to calculate the least cost restoration path. Note that DTLs may be referred to as Explicit Route Objects (EROs).

The selection and ordering of routes in a DTL set normally only consider the impacted SNC with cost functions that, for example, favor the shortest maximally diverse paths. Path optimization, which only considers the impacted SNC may lead to higher total network cost in the form of increased blocking probability for future services, and increased network fragmentation. Network capacity can be improved by a process at the orchestration level, which nominates restoration paths that maximize total network value. Here total network value can refer to the network value once a service has switched to the restoration path. It may also refer to the value of some future defragmented state, discounted by the transition costs. Situations where the value of the network state on a preferred restoration path is lower than the value on some other path, but where the chosen path is part of some preferred defragmentation solution are considered. The selection and ordering of DTL sets can be managed at the orchestration layer with the solutions used to directly configuring the DTL sets in the network elements 200, or the desired behavior can be achieved by modifying the tuning parameters used by the routing techniques that run at the node level. Importantly DTLs can be calculated by a stochastic defragmentation process that considers possible network topologies that would reduce network fragmentation and populates DTLs that cause the network to become less fragmented through its response to fiber cuts or other failure events. In doing so, partial network defragmentation is achieved at little or no cost.

Again, existing defragmentation techniques were run episodically and used a cascade of service impacting changes. This existing approach fails to take advantage of the opportunities for low-cost defragmentation that arise during network operations. Along with opportunities presented by fiber cuts, there is a broad class of network events, such as maintenance windows, where an opportunistic defragmentation process, running continuously at the orchestration layer, can propose changes that drive the network 100 toward a less fragmented state at low cost.

For the example of a planned maintenance window, the cost for making changes to the impacted services and hardware during the window is much lower than normal. An opportunistic defragmentation approach would revise its target for the optimal final network graph and the associated set of transition steps to take advantage of the window. This approach could also suggest other elements or services to add to the maintenance window and quantify the defragmentation benefit from doing so.

Opportunistic Defragmentation

Figure 4:
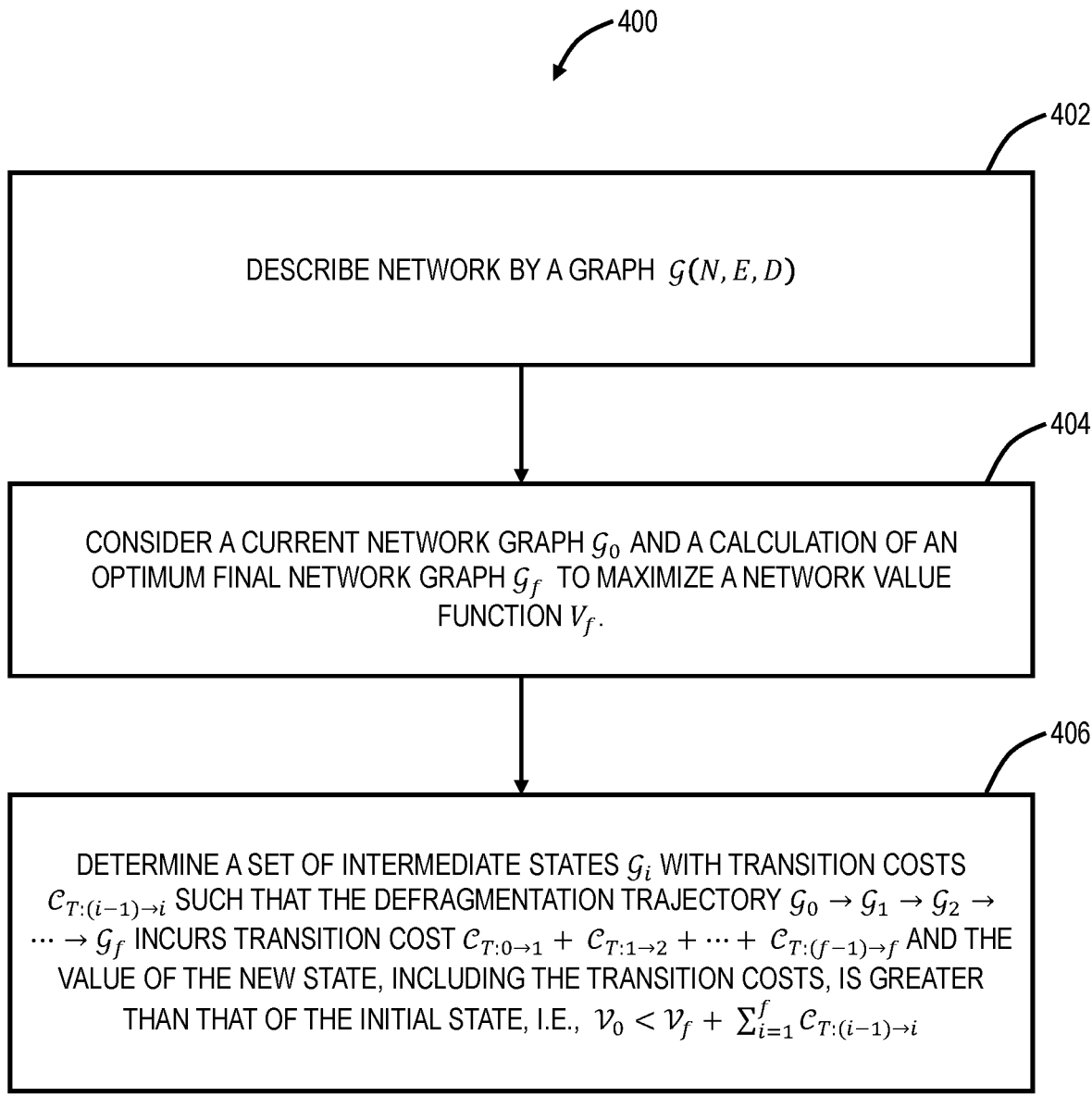
FIG. 4 is a flowchart of a formalized description of an opportunistic defragmentation process.

FIG. 4 is a flowchart of a formalized description of an opportunistic defragmentation process 400. The network 100 can be described by its graph $\mathcal{G}$ (N, E, D) which contains the set of nodes (N), edges (E), that connect the nodes, and demands (D) describing services carried by the network (step 402). For a communications network, the nodes may be the sites 110, the switches 122, the WDM network elements 124, the network elements 200, etc., and the edges may be the links 120, i.e., the fibers, which are connected between those sites 110.

The opportunistic defragmentation process 400 includes consideration of the current network graph $\mathcal{G}_0$ and a calculation of what an optimum final network condition ($\mathcal{G}_f$) will be if it is possible to re-route or change other parameters for some or all of the existing services in order to maximize the network value function $\mathcal{V}_f$ (step 404). Note, various techniques can be used for this determination. The defragmentation process determines a set of intermediate states g, with transition costs $\mathcal{C}_{T:(i-1)\rightarrow i}$ such that the defragmentation trajectory $\mathcal{G}_0 \rightarrow \mathcal{G}_1 \rightarrow \mathcal{G}_2 \rightarrow \ldots \mathcal{G}_f$ incurs transition cost $\mathcal{C}_{T:0\rightarrow 1} + \mathcal{C}_{T:1\text{-}43\ 2} + \ldots + \mathcal{C}_{T:(f-1)\rightarrow f}$ and the value of the new state, including the transition costs, is greater than that of the initial state, i.e., $$\mathcal{V}_0 < \mathcal{V}_f + \sum_{i=1}^{f} \mathcal{C}_{T:(i-1)\rightarrow i}$$

(step 406). Note that the solution for the optimal final state may need to jointly optimize the cost of the final state as well as the transition costs.

Defragmentation is not limited to optimizing the routing between nodes where the nodes are defined as sites within the network. As an example, a Reconfigurable Optical/Add Drop Multiplexer (ROADM), which is often located at a network site, may include a number of network elements such as Wavelength Selective Switches (WSSs), Optical Add Drop Modules (OADMs), Channel Multiplexer/Demultiplexer structures, etc. which are interconnected to achieve the desired ROADM behavior. This topology forms a graph where the nodes are the elements within the ROADM and the edges are the connections between those elements. In analogy to the techniques described herein at the network level, it may be desirable to defragment or make changes to a ROADM site either in isolation or as part of a larger network optimization. Changes to a ROADM site might be desirable in the event of a technology change, a change to the number ROADM degrees, changes to the number of parallel fibers traveling between sites or changes to the interconnect between combinations of degrees, parallel fibers and other network (including ROADM), elements.

Everything related to the present or future state of the network 100 can be assigned a cost. For a new or existing A-Z photonic service, there will be many contributions to the cost of that service. A non-limiting list of example costs include:

> The cost of not deploying that service
> Value to the customer, e.g., the terms of a service level agreement
> Latency
> Signal-to-Noise Ratio (SNR)
> Rate
> Blocking probability for other services
> Cost of leasing fiber or other physical infrastructure
> Cost of regeneration
> Survivability (or lack thereof), e.g., in the event of fiber cuts
> Schedule (does the new service need to be deployed immediately)
> Cost of adding new hardware Those skilled in the art will recognize the process of assigning value as well as costs to network configurations and settings is well-known, as is the process of network planning based on the assigned costs. The present disclosure includes two example aspects where the costs are augmented to include the transition cost. We allow for the process of continuous adaptation of the targeted final state and defragmentation trajectory, both of which may change to take advantage of an opportunity that presents during network operations. Opportunities to improve the defragmentation solution are identified on an ongoing basis. Defragmentation actions may supplement otherwise unrelated network events, or the responses to those events, if doing so increases the value of the final state network configuration discounted by the transition costs. The transition costs are the cost of performing a network configuration change to move from a current state to a new state. The costs can capture the service impact of the network configuration change. For a critical service that cannot be disturbed, the transition costs may be infinite or arbitrarily large. For other services, the transition costs may be based on a Class of Service, a Service Level Agreement (SLA), etc. Also, the transition costs may be based on equipment costs, etc.

A-Z paths for new and existing services can be treated in the same way, although the costs may be very different for different actions. For example, the costs of adding, moving, or deleting a photonic service may be related based on: (Adding)<(Moving)<<(Deleting). Where in this example, the cost of deleting an existing service which is still needed may be high but may be worth paying if the service blocks deployment of a more valuable service.

In this disclosure, it is recognized that defragmentation is best run continuously with a process that is designed to recognize opportunities for reducing future fragmentation in the network 100 by responding to network events in real-time.

As a simple example for illustration purposes, consider a sub-optimal connection to some port that is carrying critical services that must not be disturbed. The defragmentation cost for moving that connection may be close to infinite (i.e., the services should not be disturbed), and the present optimal graph $G_f$ includes that service going through the sub-optimal port. In a scenario where that service gets disconnected, the optimal defragmentation trajectory changes and the cost of the new optimal graph $G'_f$ may be lower, at least until the service is re-connected. An opportunistic defragmentation process that runs continuously on or with the network 100 would have visibility of the service disconnection. If it can calculate a new optimal state and defragmentation trajectory, (which would include re-connecting the critical service in a better place), and communicate that plan to the network 100 in time, it may be possible to reduce fragmentation in the short term and drive the network 100 toward a better final state than would have otherwise been possible.

Opportunistic Defragmentation Process

Figure 5:
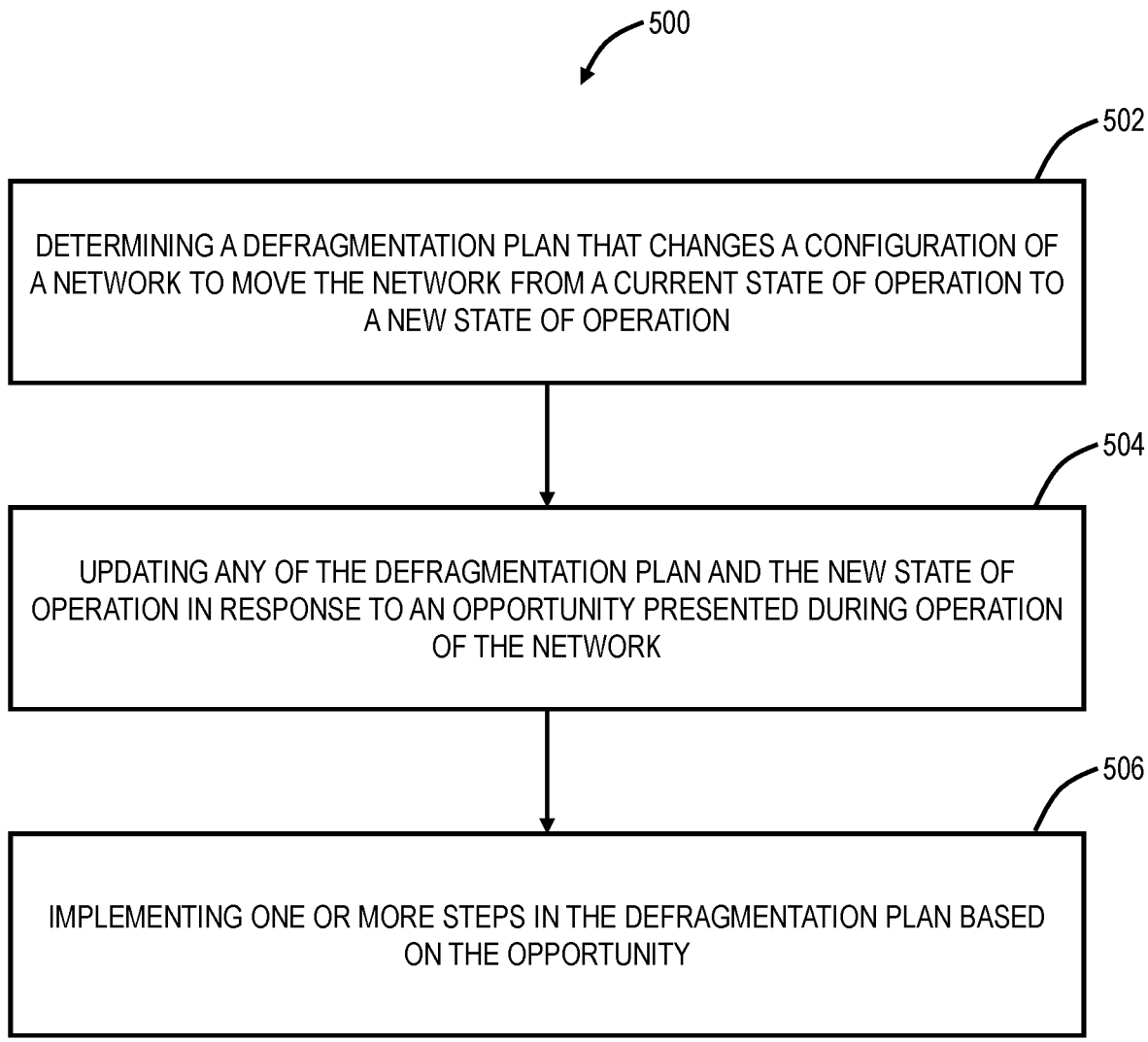
FIG. 5 is a flowchart of an opportunistic defragmentation process.

FIG. 5 is a flowchart of an opportunistic defragmentation process 500. The opportunistic defragmentation process 500 can be implemented via an orchestration layer, such as the control plane 140, the SDN controller 160, the management system 170, etc. The opportunistic defragmentation process 500 can be realized as a computer-implemented method, via the controller 300, and as instructions stored in a non-transitory computer-readable medium where the instructions cause a processor to perform the associated steps.

The opportunistic defragmentation process 500 includes determining a defragmentation plan that changes a configuration of a network to move the network from a current state of operation to a new state of operation (step 502); updating any of the defragmentation plan and the new state of operation in response to an opportunity presented during operation of the network (step 504); and implementing one or more steps in the defragmentation plan based on the opportunity (step 506).

In an embodiment, the opportunity is anticipated to occur at a future time and implementation of the one or more steps is conditioned on occurrence of the opportunity. For example, the opportunity includes any of a maintenance window, a network equipment change, a capacity change in the network, a change to demand in the network, an external event including weather, and changes in links in the network. Of course, other types of future opportunities are contemplated, i.e., anything planned in the future that may be used for implementation of some change in the network in furtherance of the defragmentation plan. For example, the opportunistic defragmentation process 500 may recognize activity in a given part of the network 100 and move services away from that area or adapt restoration paths to avoid paths that go through that area. Examples of activity may include fiber measurements which suggest construction or maintenance along fiber routes, weather events or anticipated market changes. In another embodiment, the opportunity includes a maintenance window, and the steps further include providing a recommendation of any of hardware and services that may be included or added as part of the maintenance window to additional further the implementing of the defragmentation plan or to improve the new state. For example, the defragmentation plan might determine that there are not enough possible restoration paths in one part of the network given an observed change to weather patterns and recommend the addition of new physical hardware, lighting up dark fiber, etc. Again, the opportunity can include a maintenance window, and the steps can further include providing a recommendation of additional hardware that may added as part of the maintenance window to further the implementing of the defragmentation plan or to improve the new state.

In a further embodiment, the opportunity includes a fault. For the fault, the one or more steps can include changing any of a path of a photonic service and a wavelength or spectrum of the photonic service, in response to the fault. The defragmentation plan can include a sequence of steps between the current state of operation to the new state of operation, each including a transition cost. The one or more steps can be selected to optimize one or more of a value of the new state and the transition cost in consideration of the opportunity. For example, the current value, and the new value can be determined based on any of latency, Signal-to-Noise Ratio (SNR), rate, blocking probability, survivability, cost of deactivating a service, schedule costs, anticipated demand, and hardware costs. Also, those skilled in the art will recognize any optimization or process is contemplated with respect to computing the current and the new values and transition costs.

As described herein, the opportunity was not contrived for the purpose of aiding defragmentation. That is, the opportunity is not caused for the purpose of the implementing, but happens to be something else already planned to occur or something that is unplanned that occurs anyway, e.g., a fault. The opportunity arises from a network event which was not initiated for the purpose of supporting defragmentation, but where an opportunistic defragmentation engine is able to recognize that the defragmentation solution can be adapted to take advantage of the opportunity as well as modifying the defragmentation plans and the new state in response to the opportunity.

The operation of the network includes monitoring of the network to identify a plurality of opportunities. That is, the defragmentation plan can be something that evolves, changes, is updated, etc. over time based on current operation, changes in the network, etc. The opportunistic defragmentation process 500 can run continuously at the orchestration layer of a network. The opportunistic defragmentation process 500 can be performed responsive to changes in the network state and is capable of continuously adjusting the planned defragmentation trajectory and current view of the optimal network graph. The opportunistic defragmentation process 500 responds to slow changes such as the evolution of a demand set as well as immediate events such as broken connections. The intent is for the opportunistic defragmentation process 500 to react fast enough to be able to suggest a course of action in response to network events that address an immediate problem while providing a more optimal defragmentation trajectory and final network graph. Also, the defragmentation plan can be determined based on an initial opportunity. An advantage of the opportunistic defragmentation process 500 is in the continuous monitoring of the network 100 and adapting a defragmentation solution to capitalize on events that occur in real-time through changes to the network 100 and transition cost functions. Deep reinforcement learning with Monte Carlo Tree Search or Genetic Algorithms can be used to solve for the transition steps given real-time values for the network 100 and transition cost functions.

A photonic service may have DTL sets that describe primary as well as restoration paths. The opportunistic defragmentation process 500 may determine that a possible restoration path for a service is more optimal than its home path. The set of possible restoration paths could be re-ordered to place the best restoration path first. This can be done for all protected services, and the routing/ordering can consider the global network optimum, which may include some measure of the probability that a given service will fail. Note that the preferred restoration path may not be the lowest cost in the short term. The optimum minimizes the total cost of the defragmentation trajectory and final state. Normally, a service transitions to a restoration path and then returns to its home path once the home path is restored. The opportunistic defragmentation process 500 may determine that the restoration path is more optimal than the home path. In that case, the restoration path should be re-defined as the home path. The defragmentation trajectory can be developed in anticipation of network cuts.

The Routing Modulation and Spectral Assignment (RMSA) for new service requests are normally done by a separate RMSA process. In most cases, existing services are not moved to clear the path for a new service (although they could be). An optimized RMSA process will consider the anticipated future demand set, as well as the arrangement of existing services and their planned restoration paths, to choose a path that avoids future blocking or wavelength contention. These are the same objectives used by the opportunistic defragmentation process 500, which looks to rearrange the network graph to avoid future blocking. From the perspective of defragmentation, the introduction of a new service changes the optimal final network state and defragmentation trajectory. The placement of a new service should be chosen in consideration of the planned future demand set, defragmentation trajectory, and optimal final network graph, i.e., the network state after defragmentation is complete. All three may change in response to the new service request. RMSA should be treated as a subset of defragmentation where the channel placement should be made in consideration of the defragmentation plan. That plan would ideally update prior to placing the new service but, at a minimum, should be re-calculated after the new service is placed to account for changes to the as-built network as well as the actual versus anticipated demand set. This approach requires the opportunistic defragmentation process 500, which is running in near real-time and is responsive to network events. In this case, the network event is the request for a new service, i.e., a capacity change. This allows for a level of optimization, which is not possible with episodic defragmentation.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, one or more processors, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable storage medium having computer readable code stored thereon for programming a processor to perform steps of:

determining a defragmentation plan that changes a configuration of a network to move the network from a current state of operation to a new state of operation, wherein the defragmentation plan includes a sequence of steps between the current state of operation to the new state of operation, each step including a transition cost;

updating any of the defragmentation plan and the new state of operation in response to an occurrence of an opportunity presented during operation of the network; and implementing one or more steps in the defragmentation plan based on the occurrence of the opportunity, wherein the opportunity is an event associated with the network that does not occur for the defragmentation plan and happens to be something else already planned to occur or something that is unplanned that occurs anyway, thereby causing an overall transition cost to be low or zero due to the opportunity.

2. The non-transitory computer-readable storage medium of claim 1, wherein the opportunity is anticipated to occur at a future time and implementation of the one or more steps is conditioned on occurrence of the opportunity.

3. The non-transitory computer-readable storage medium of claim 2, wherein the opportunity includes any of a maintenance window, a network equipment change, a capacity change in the network, a change to demand in the network, an external event including weather, and changes in links in the network.

4. The non-transitory computer-readable storage medium of claim 2, wherein the opportunity includes a maintenance window, and the steps further include
providing a recommendation of any of additional hardware and services that may be included or added as part of the maintenance window to further the implementing of the defragmentation plan or to improve the new state.

5. The non-transitory computer-readable storage medium of claim 1, wherein the steps further include
providing a recommendation of additional hardware that may added to further the implementing of the defragmentation plan or to improve the new state.

6. The non-transitory computer-readable storage medium of claim 1, wherein the opportunity includes a fault.

7. The non-transitory computer-readable storage medium of claim 6, wherein the one or more steps include changing any of a path of a photonic service and a wavelength or spectrum of the photonic service, in response to the fault.

8. The non-transitory computer-readable storage medium of claim 1, wherein the one or more steps are selected to optimize one or more of a value of the new state and the transition cost in consideration of the opportunity.

9. The non-transitory computer-readable storage medium of claim 1, wherein the operation of the network includes monitoring of the network to identify a plurality of opportunities.

10. The non-transitory computer-readable storage medium of claim 1, wherein the defragmentation plan is determined based on an initial opportunity.

11. An apparatus comprising:
a network interface and a processor communicatively coupled to one another; and
memory comprising instructions that, when executed, cause the processor to
determine a defragmentation plan that changes a configuration of a network to move the network from a current state of operation to a new state of operation, wherein the defragmentation plan includes a sequence of steps between the current state of operation to the new state of operation, each step including a transition cost,
update any of the defragmentation plan and the new state of operation in response to an occurrence of an opportunity presented during operation of the network, and
implement one or more steps in the defragmentation plan based on the occurrence of the opportunity, wherein the opportunity is an event associated with the network that does not occur for the defragmentation plan and ha ns to be something else already planned to occur or something that is unplanned that occurs anyway, thereby causing an overall transition cost to be low or zero due to the opportunity.

12. The apparatus of claim 11, wherein the opportunity is anticipated to occur at a future time and implementation of the one or more steps is conditioned on occurrence of the opportunity.

13. The apparatus of claim 11, wherein the opportunity includes a fault.

14. The apparatus of claim 11, wherein the operation of the network includes monitoring of the network to identify a plurality of opportunities.

15. The method of claim 14, wherein the opportunity is anticipated to occur at a future time and implementation of the one or more steps is conditioned on occurrence of the opportunity.

16. A method comprising:
determining a defragmentation plan that changes a configuration of a network to move the network from a current state of operation to a new state of operation, wherein the defragmentation plan includes a sequence of steps between the current state of operation to the new state of operation, each step including a transition cost;
updating any of the defragmentation plan and the new state of operation in response to an occurrence of an opportunity presented during operation of the network; and
implementing one or more steps in the defragmentation plan based on the occurrence of the opportunity, wherein the opportunity is an event associated with the network that does not occur for the defragmentation plan and happens to be something else already planned to occur or something that is unplanned that occurs anyway, thereby causing an overall transition cost to be low or zero due to the opportunity.

* * * * *